W. W. BRISSENDEN.
AUTOMATIC RELIEF VALVE FOR STEAM RADIATORS.
APPLICATION FILED JULY 22, 1904.
952,414.
Patented Mar. 15, 1910.
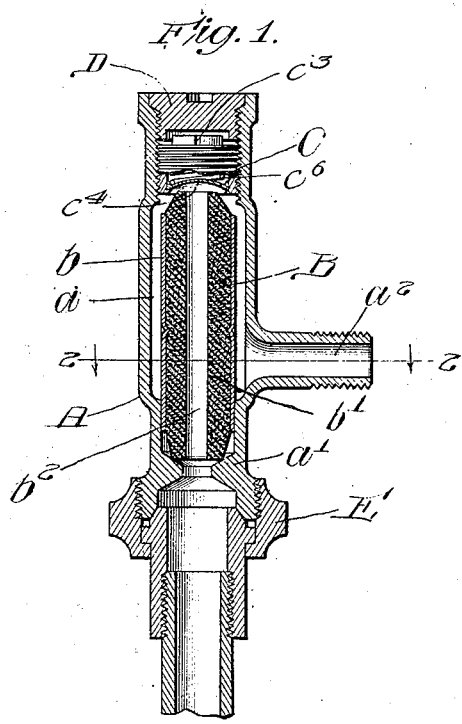
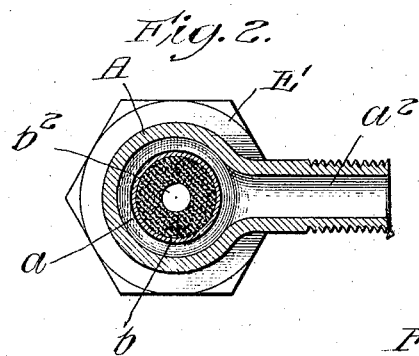
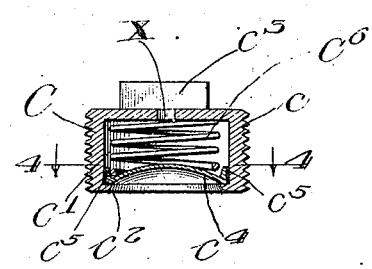
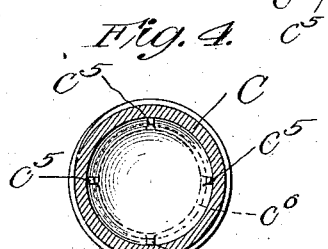
Witnesses:
Robert H. Weir
J. B. Weir
Inventor:
Walter W. Brissenden
By Bulkley & Durand
Attorneys

UNITED STATES PATENT OFFICE.

WALTER W. BRISSENDEN, OF CHICAGO, ILLINOIS, ASSIGNOR TO NATIONAL STEAM SPECIALTY COMPANY, OF CHICAGO, ILLINOIS, A CORPORATION.

AUTOMATIC RELIEF-VALVE FOR STEAM-RADIATORS.

952,414.   Specification of Letters Patent.   Patented Mar. 15, 1910.

Application filed July 22, 1904. Serial No. 217,630.

*To all whom it may concern:*

Be it known that I, WALTER W. BRISSENDEN, a citizen of the United States of America, and resident of Chicago, Cook county, Illinois, have invented a certain new and useful Improvement in Automatic Relief-Valves for Steam-Radiators, of which the following is a specification.

My invention relates to automatic relief valves for steam radiators; and it contemplates broadly a yielding seat against which either end of the expansible valve may bear or rest, so as to prevent injury to the valve should the said expansible member continue to expand beyond the limits necessary for just closing the valve, in combination with means whereby the displacement of said yielding seat is indicated; and more specifically it contemplates an improvement on the form of valve shown in application No. 196,325, filed by me in the United States Patent Office for improvements in relief valves for radiators.

In the accompanying drawings: Figure 1 is a vertical section of an automatic relief valve embodying the principles of my invention; Fig. 2 is a horizontal section on line 2—2 in Fig. 1; Fig. 3 is an enlarged vertical section of the improved valve seat shown at the upper portion of Fig. 1; Fig. 4 is a section on line 4—4 in Fig. 3.

So far as the broad idea of providing a yielding seat for either end of the expansible valve member is concerned, it will be readily understood that the general construction of the valve may be of any suitable, known or approved character. As herein illustrated, however, the general construction of the valve comprises a casing A, an expansible member B provided with a metal sheath or sleeve $b$, an adjustable valve seat C, and a covering plug D. It will be seen that the valve as a whole is also provided with a coupling E on its lower end; and the casing between its ends may be slightly enlarged to provide a chamber $a$, and can be provided at its lower end with a shoulder or ledge $a^1$. The interior surface of the upper end of the casing is preferably threaded to receive the adjustable valve seat and the covering plug. As illustrated, said expansible member B consists of a tube $b^1$ of any well known material which expands readily when subjected to the heat. With this arrangement, the air can enter the valve through the lateral inlet $a^2$, and thence pass upwardly and over the upper end of the expansible member B, and thence escape downwardly through the air passage $b^2$ of said member. As soon as the steam enters the valve, the heat will then cause the member B to expand until its upper end engages the valve seat C. In this way, the valve automatically closes as soon as the air has escaped from the radiator.

In practice, it is customary to adjust the valve structure as a whole with relation to the normal or desired temperature for the steam; and this is the general practice with all valves. It is obvious, therefore, that with the old construction of valve, should the expansible member at any time be subjected to an abnormally high temperature, the expansible composition will most likely become crushed or buckled, or injured in some other way. The adjustable valve seat C is, therefore, preferably constructed as follows: The seat is composed preferably of an externally threaded body portion $c$ provided with a chamber $c^1$ having a shoulder or ledge $c^2$ formed around the lower edge of the body. The upper end of said valve-seat-body can be provided with a portion $c^3$ whereby it can be screwed into and out of the valve casing by means of a screw driver or other tool. The valve-seat as a whole includes a plate $c^4$ having a concave lower face and having also a number of lugs $c^5$ projecting upwardly around its edge or perimeter. Said plate is of a size to fit the chamber $c^1$, but loosely enough to permit leakage around its edges, and thence upwardly through the opening or indicating device $x$, when the said plate is raised from its seat or resting place on the ledge $c^2$. Normally, said plate is maintained in place upon said ledge $c^2$ by means of a spring $e$ interposed between the crown or upper wall of the chamber $c^1$ and the convex or upper surfaces of said plate. In this way, said plate can rise from its seat or resting place; and at such time the lugs $c^5$ which are provided with straight or vertical bearing faces prevent the plate from binding against the side walls of the chamber in which it is located. In use, the valve-seat C thus constructed is screwed down in the casing A until it arrives at a point where the upper end of the expansible valve-member B will just engage the concave face of the plate $c^4$, when steam at the proper temperature enters the valve. Obviously, however, should the steam be above the normal or desired temperature, the expansible valve-member B will then expand longitudinally and in such manner as to raise the plate $c^4$ from its annular seat or resting place. In this way, the valve-seat is practically provided with a yielding face, whereby abnormal or undue expansion on the part of the expansible composition is prevented from doing any harm whatever to the valve as a whole; and particularly from causing the expansible composition to crack, buckle, crush or otherwise become unfit for further use.

It is obvious that, in adjusting the plug-like valve-seat C, and in case the same is adjusted too near the expansible valve-member, the steam will, when the said valve-member expands, escape upwardly through the said plug-like valve-seat, thereby indicating that accurate adjustment of the valve-seat has not, as yet, been attained. Also, it will be readily understood that the ledge or annular seat upon which the concave plate or the valve-seat rests, may be produced in different ways—that is to say, the plate can, for example, be first inserted in the chambered plug portion of the valve-seat, and the lower edge of said screw-seat threaded or chambered portion reamed or spun over to form the said annular ledge.

With the expansible valve-member inclosed in a metal sheath or sleeve, the endwise expansion of the valve-member is quite positive and powerful, but this added expansive power is taken care of by the spring-backed valve-seat, so that the combination of the sheath or sleeve and the spring-backed valve-seat constitute a peculiarly efficient construction, while the combination of the spring-backed valve-seat and the loosely disposed expansible valve-member insure good results and certainty of operation in a construction which is comparatively simple and economical to manufacture, it being unnecessary to fasten the hollow valve-member at its lower end, or to expend great care in making the valve-member of an exact length, or to resort to other well-known precautions which would be necessary in a structure not characterized by my invention.

The opening in the top of the plug C serves as an indicating device for telling when the valve-seat is displaced. When the cap D is off, and when the valve is being adjusted for use, the escape of steam through the opening X will serve to indicate to the user or the steam fitter the location of the valve-seat. In this way, the exact or proper adjustment can be obtained even after the valve is fully connected up in the system, and even when the steam is turned on.

It is to be understood that while in the form illustrated and described I have disclosed a means whereby the escape of steam serves as a visual signal of the displacement of the valve-seat, I do not limit myself to any specific mechanism or form of signal, as any suitable means whereby such fact is audibly or visibly indicated are clearly within the scope of my invention.

What I claim as my invention is:

1. A valve comprising a valve-member adapted to expand when subjected to heat, and an adjustable valve-seat provided with a spring-pressed face adapted to be engaged by said valve-member when the latter expands under the influence of heat, or when the valve-seat is adjusted into contact with the expansible valve-member, said valve-seat having its top provided with means whereby displacement of said face is indicated.

2. A valve comprising a valve casing, an expansible valve-member within said casing, and an adjustable valve-seat screwed into the upper end of said casing and provided with a spring-pressed face adapted to be engaged by the upper end of said valve-member when the latter expands under the influence of heat, or when the valve-seat is adjusted into contact with the expansible valve-seat, said valve-seat having its top provided with means whereby displacement of said face is indicated.

3. A valve comprising a valve-casing, a valve-member consisting of a tube of expansible material inclosed within a jacket or sleeve of suitable material, and an adjustable valve-seat screwed into the upper portion of said casing and provided with a spring-pressed plate adapted to be engaged by the upper end of said valve-member when the latter expands longitudinally of said jacket or sleeve, and means whereby displacement of said face is indicated.

4. A valve comprising a valve-member adapted to expand when subjected to heat, and a yielding valve-seat, said valve-member being provided with a metal sheath or sleeve to which it is secured at one point only in its length, whereby the said valve-member has substantially a full length frictional engagement with the inner surface of said sheath or sleeve, said valve-seat adapted to be displaced by the movement of the valve-member within the sheath or sleeve, and means whereby displacement of said seat is indicated.

5. A valve comprising a valve-member adapted to expand when subjected to heat, a lower valve-seat, and an upper yielding valve-seat, said valve-member being loosely disposed between said yielding valve-seat at the top and the other valve-seat at the bottom, whereby it rests loosely on one seat and is opposed by the yielding seat, and the structure as a whole having a lower outlet and a lateral inlet, the said inlet being disposed between the said upper and lower valve-seats, and means whereby displacement of said yielding valve-seat is indicated.

6. A valve comprising a valve-casing, a valve-member consisting of a tube of expansible material inclosed within a jacket or sleeve of suitable material, and an adjustable valve-seat screwed into the upper portion of said casing and provided with a spring-pressed plate adapted to be engaged by the upper end of said valve-member when the latter expands under the influence of heat, said valve-member being provided with a longitudinal outlet passage controlled by said spring pressed plate, and the structure as a whole having a lower outlet and a lateral inlet, said inlet being disposed between the upper and lower ends of said valve-member, said valve-seat adapted to be displaced by the movement of the valve-member in the jacket or sleeve, and means whereby displacement of said plate is indicated.

7. A valve comprising a valve-member adapted to expand when subjected to heat, and a spring-pressed valve-seat, the said valve-seat and its spring backing being non-detachable from each other and organized into a structure which is removable as a unit from the interior of the balance of the valve structure, the spring being fully inclosed by such unit, and means whereby displacement of said seat is indicated.

8. A valve comprising a valve-casing, an expansible valve-member within said casing, and an adjustable valve-seat screwed into the upper end of said casing and provided with a spring-pressed face adapted to be engaged by the upper end of said valve-member when the latter expands under the influence of heat, said valve-member being provided with a metal sheath or sleeve to which it is secured at one point only in its length, whereby the said valve-member has substantially a full length frictional engagement with the inner surface of said sheath or sleeve, the said valve-face and its spring backing being non-detachable from each other and organized into a structure which is removable as a unit from the interior of the balance of the valve structure, the spring being fully inclosed by such unit, and means whereby displacement of said face is indicated.

9. A valve comprising a valve-member adapted to expand when subjected to heat, and a spring-pressed valve-seat, together with a passage controlled by said valve-seat and adapted to be opened when said seat is displaced from its normal position by excessive expansion on the part of said valve-member.

10. A valve comprising a valve-member adapted to expand when subjected to heat, and an adjustable valve-seat provided with a spring-pressed face adapted to be engaged by said valve-member when the latter expands under the influence of heat, or when said valve-seat is adjusted against the valve-member, together with a passage controlled by said spring-pressed valve-seat and adapted to be opened when said seat is displaced from its normal position by excessive expansion on the part of said valve-member, or when the valve-seat is adjusted into contact with the valve member.

11. A valve comprising a valve-member adapted to expand when subjected to heat, a lower valve-seat, and an adjustable valve-seat provided with a spring-pressed face adapted to be engaged by said valve-member when the latter expands under the influence of heat, or when the valve-seat is adjusted into contact with said valve-member, said valve-member being loosely disposed between said spring-pressed valve-seat at the top and the other valve-seat at the bottom, and the structure as a whole having a lower outlet and a lateral inlet, the said inlet being disposed between the said upper and lower valve-seats, together with a passage controlled by said spring-pressed valve-seat and adapted to be opened when said seat is displaced from its normal position by excessive expansion on the part of said valve-member, or when the valve-seat is adjusted into contact with said valve-member.

12. A valve comprising a valve-casing, an expansible valve-member within said casing, and an adjustable valve-seat screwed into the upper end of said casing and provided with a spring-pressed face adapted to be engaged by the upper end of said valve-member when the latter expands under the influence of heat, or when the valve-seat is adjusted into contact with said valve-member, said valve-member being provided with a longitudinal outlet passage controlled by the valve composed of the said valve-seat and the upper end of the valve-member, and the structure as a whole having a lower outlet and a lateral inlet, said inlet being disposed between the upper and lower ends of said valve-member, together with a passage controlled by said spring-pressed valve-seat and adapted to be suitably affected to indicate when said seat is displaced from its normal position by excessive expansion on the part of said valve-member, or when the valve-seat is adjusted.

13. In a device of the class specified, a valve-casing, a hollow plug screwed into the casing, a spring inclosed in said plug, a movable valve-seat in the end of said plug yieldingly held in place by said spring, and a heat-operated valve-member adapted to engage said valve-seat to close the passage through the valve-casing, said plug closing one end of the casing and adjustable therein to vary the position of the valve-seat relatively to the end of said valve-member, and means whereby displacement of said seat is indicated.

14. In a device of the class specified, a valve-casing, a hollow plug screwed into the casing, a spring inclosed in said plug, a movable valve-seat in the end of said plug yieldingly held in place by said spring, and a hollow heat-operated valve-member adapted to engage said valve seat to close passage through said member, said plug closing one end of the casing and adjustable therein to vary the position of the valve-seat relatively to the end of said valve-member, and means whereby displacement of said seat is indicated.

15. In a radiator relief valve, the combination of an expansible valve-member, a casing, and a plug screwed into said casing, said plug provided at one end with a displaceable seat to be engaged by said valve-member to close the passage through the valve, and at the other end with means permitting displacement of said seat to be suitably indicated.

16. In a radiator relief valve, the combination of an expansible valve-member, a displaceable seat to be engaged by said valve-member to close the passage through the valve, and means controlled by said seat for permitting displacement thereof to be suitably indicated.

17. In an air valve for radiators, the combination of a valve-member adapted to expand when subjected to heat, an adjustable member and a yieldable device carried by said adjustable member and against which said valve-member is adapted to seat, said air valve provided with means permitting contact between said valve-member and said yieldable device to be indicated during the adjustment of said adjustable member.

18. In an air valve for radiators, the combination of a casing, a valve-member inclosed therein and adapted to expand when subjected to heat, a member adjustable toward and from said expansible member and carrying a spring-actuated yieldable device against which said valve-member is adapted to seat, the parts being so combined that adjustment of the movable member into contact with the valve-member displaces the yielding device, the movable member and the yielding device embodying means for conjointly indicating exteriorly to the casing the displacement of the yielding device.

Signed by me at Chicago, Cook county, Illinois, this 7th day of July 1904.

WALTER W. BRISSENDEN.

Witnesses:
CLARENCE M. THORNE,
E. A. GARDINER.